United States Patent
O'Hare

(10) Patent No.: US 7,555,569 B1
(45) Date of Patent: Jun. 30, 2009

(54) QUICK CONFIGURATION STATUS

(75) Inventor: Jeremy O'Hare, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 161 days.

(21) Appl. No.: 10/769,943

(22) Filed: Feb. 2, 2004

(51) Int. Cl.
*G06F 3/00* (2006.01)

(52) U.S. Cl. .............. 710/8; 710/5; 710/9; 710/10; 710/11; 710/14; 710/18; 707/200; 707/201; 707/203; 714/48; 714/49; 714/50; 714/51; 714/52; 714/53; 714/54; 714/55; 714/56; 714/57

(58) Field of Classification Search .............. 710/5, 710/15–16, 18, 8–11, 14; 707/200–201, 707/203; 714/48–57
See application file for complete search history.

(56) References Cited

U.S. PATENT DOCUMENTS

| | | | |
|---|---|---|---|
| 5,206,939 A | | 4/1993 | Yanai et al. |
| 5,717,950 A | * | 2/1998 | Yamaguchi et al. .......... 710/8 |
| 5,764,930 A | * | 6/1998 | Staats .................. 710/107 |
| 5,778,394 A | | 7/1998 | Galtzur et al. |
| 5,845,147 A | | 12/1998 | Vishlitzky et al. |
| 5,857,208 A | | 1/1999 | Ofek |
| 5,978,854 A | * | 11/1999 | Fujimori et al. ............ 709/245 |
| 5,991,829 A | * | 11/1999 | Giorgio et al. .............. 710/15 |
| 6,487,562 B1 | * | 11/2002 | Mason et al. .............. 707/205 |
| 6,959,344 B2 | * | 10/2005 | Murotani et al. ............ 710/15 |

\* cited by examiner

*Primary Examiner*—Niketa I Patel
*Assistant Examiner*—Chun-Kuan Lee
(74) *Attorney, Agent, or Firm*—Muirhead and Saturnelli, LLC

(57) ABSTRACT

Described are techniques for obtaining configuration information and conditionally executing a system call in accordance with a specified configuration state. A host issues a request for configuration information from a data storage system. The data storage system maintains a separate table of configuration information representing a configuration state of the data storage system. The host receives a response including a custom value indicating the current configuration state. The host may issue a request to the data storage system to conditionally execute a call if the data storage system is in a configuration state corresponding to the custom value.

32 Claims, 11 Drawing Sheets ent systems may be interconnected by one or more
QUICK CONFIGURATION STATUS

BACKGROUND

1. Technical Field

This application generally relates to a computer system, and more particularly to obtaining configuration information and executing a call within the computer system.

2. Description of Related Art

Computer systems may include different resources used by one or more host processors. Resources and host processors in a computer system may be interconnected by one or more communication connections. These resources may include, for example, data storage devices such as the Symmetrix™ family of data storage systems manufactured by EMC Corporation. These data storage systems may be coupled to one or more host processors and provide storage services to each host processor. An example data storage system may include one or more data storage devices, such as those of the Symmetrix™ family, that are connected together and may be used to provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845, 147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

A host may issue a call to a data storage system, such as the Symmetrix™ data storage system, requesting configuration information. Such configuration information may include, for example, data regarding the availability, status, or other attribute about the data storage system, or a resource therein. The host may subsequently take an action in accordance with the configuration information received. A problem may arise if a change in the configuration information occurs between the time when the configuration information is returned to the host, and when the host takes the action. The change may cause the configuration information received by the host to become outdated or otherwise inaccurate. As a result, the host may not be taking the action in accordance with correct state of the data storage system as may be represented by the configuration information. Additionally, the host may issue multiple calls to obtain all the configuration information such that overhead associated with multiple calls is incurred increasing the amount of time between when a query is made by the host and when the host's action is taken.

It may be desirable to provide a technique for efficiently obtaining information, such as configuration information, from a data storage system. It may also be desirable that this technique provide for reducing the amount of time between when information is requested, and when an action may be taken in accordance with the information. It may also be desirable that the action be taken in accordance with a specified condition such that, for example, if a configuration has changed since a query request, the action is not taken.

SUMMARY OF THE INVENTION

In accordance with one aspect of the invention is a method for executing a call on a data storage system. A request is received to perform a call including at least one conditional criteria for performing the call. The at least one conditional criteria is evaluated in accordance with a current configuration of the data storage system. The call is executed call if the at least one conditional criteria is met in accordance with the current configuration. The conditional criteria may include an indication of at least one of: availability of a resource, performing an I/O operation, modifying raw configuration data, modifying a device, performing a database operation, and performing an operation with respect to an associated group of one or more devices. The method may also include sending a request from a host to a data storage system to perform the call. The at least one conditional criteria may include a plurality of configuration conditions. The method may include issuing a request for current configuration information, wherein the request is made prior to the call including the at least one conditional criteria. The method may include receiving a response to the request for current configuration information including a return parameter used as an input parameter to the call specifying the at least one conditional criteria in accordance with at least one configuration parameter value. The method may include receiving a first response at a first point in time, the first response including first configuration information formed using data stored in a first location; receiving a second response at a second point in time, the second response including second configuration information formed using data stored in the first location; and determining whether there has been a change in configuration state using the first and second configuration information, wherein the first and the second configuration information each indicate a configuration state of the data storage system at different points in time. The method may also include obtaining revised actual configuration data from a second location different from the first location. A time value may be used in determining if there has been a change in configuration state. The method may also include issuing, by a host to a data storage system, the request to perform the call if there has been no change in configuration state determined.

In accordance with another aspect of the invention is a method for determining configuration information. A first value is obtained. If the first value corresponds to a stored first value, configuration information is obtained from a first location. If the first value does not correspond to the stored first value, a second value is obtained. If the second value does not correspond to a stored second value, revised configuration information is obtained, and the first location, the stored first value, and the stored second value are updated. The first location may be local to a host caching the configuration information. The method may also obtaining, by a host, said first value from a data storage system, wherein the data storage system produces the first value using information stored in a third location different from a location of the revised configuration information. The first value may correspond to a configuration state of the data storage system and one or more configuration parameter values. The host may set an indicator corresponding to the one or more configuration parameter values in a request, and the data storage system may return a response including the first value and the second value. A second value may be specified for each of the one or more parameter values as indicated by the indicator. The host may issue a request for the revised configuration information. One or more configuration parameter values may indicate a state of a corresponding portion of actual configuration data, the revised configuration information being the corresponding portion of actual configuration data.

In accordance with another aspect of the invention is a computer program product that executes a call on a data storage system comprising executable code that: receives a request to perform a call including at least one conditional criteria for performing said call; evaluates said at least one conditional criteria in accordance with a current configuration of said data storage system; and executes said call if said at least one conditional criteria is met in accordance with said current configuration. The conditional criteria may include an indication of at least one of: availability of a resource, performing an I/O operation, modifying raw configuration data, modifying a device, performing a database operation, and performing an operation with respect to an associated group of one or more devices. The computer program product may include executable code that sends a request from a host to a data storage system to perform said call. The at least one conditional criteria may include a plurality of configuration conditions. The computer program product may include: executable code that issues a request for current configuration information, wherein said request is made prior to said call including said at least one conditional criteria. The computer program product of may include executable code that receives a response to said request for current configuration information including a return parameter used as an input parameter to said call specifying said at least one conditional criteria in accordance with at least one configuration parameter value. The computer program product may also include executable code that: receives a first response at a first point in time, said first response including first configuration information formed using data stored in a first location; receives a second response at a second point in time, said second response including second configuration information formed using data stored in said first location; and determines whether there has been a change in configuration state using said first and second configuration information, wherein said first and said second configuration information each indicate a configuration state of said data storage system at different points in time. The computer program product may also include executable code that obtains revised actual configuration data from a second location different from said first location. A time value may be used in determining if there has been a change in configuration state. The computer program product may also include executable code that issues, by a host to a data storage system, said request to perform said call if there has been no change in configuration state determined.

In accordance with another aspect of the invention is a computer program product that determines configuration information comprising executable code that: obtains a first value; obtains configuration information from a first location if the first value corresponds to a stored first value; obtains a second value if the first value does not correspond to the stored first value; obtains revised configuration information and updates the first location, the stored first value, and the stored second value, if said second value does not correspond to a stored second value. The first location may be local to a host caching said configuration information. The computer program product may also include executable code that obtains, by a host, said first value from a data storage system, wherein said data storage system produces said first value using information stored in a third location different from a location of said revised configuration information. The first value may correspond to a configuration state of said data storage system and one or more configuration parameter values. The host may set an indicator corresponding to said one or more configuration parameter values in a request, and said data storage system returns a response including said first value and said second value. A second value may be specified for each of said one or more parameter values as indicated by said indicator. The host may issue a request for said revised configuration information. One or more configuration parameter values may indicate a state of a corresponding portion of actual configuration data, said revised configuration information being said corresponding portion of actual configuration data.

In accordance with another aspect of the invention is a computer system comprising: a host issuing a request; and a data storage system comprising executable code that executes a call, said data storage system including executable code that: receives said request to perform said call including at least one conditional criteria for performing said call; evaluates said at least one conditional criteria in accordance with a current configuration of said data storage system; and executes said call if said at least one conditional criteria is met in accordance with said current configuration. The conditional criteria may include an indication of at least one of: availability of a resource, performing an I/O operation, modifying raw configuration data, modifying a device, performing a database operation, and performing an operation with respect to an associated group of one or more devices. The at least one conditional criteria may include a plurality of configuration conditions. The host may further comprise executable code that issues a request for current configuration information, wherein said request is made prior to said call including said at least one conditional criteria. The host may further comprise executable code that receives a response to said request for current configuration information including a return parameter used as an input parameter to said call specifying said at least one conditional criteria in accordance with at least one configuration parameter value. The host may also include executable code that: receives a first response at a first point in time, said first response including first configuration information formed using data stored in a first location; receives a second response at a second point in time, said second response including second configuration information formed using data stored in said first location; and determines whether there has been a change in configuration state using said first and second configuration information, wherein said first and said second configuration information each indicate a configuration state of said data storage system at different points in time. The host may further comprise: executable code that obtains revised actual configuration data from a second location different from said first location. The host may also include executable code that: issues, to said data storage system, said request to perform said call if there has been no change in configuration state determined.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
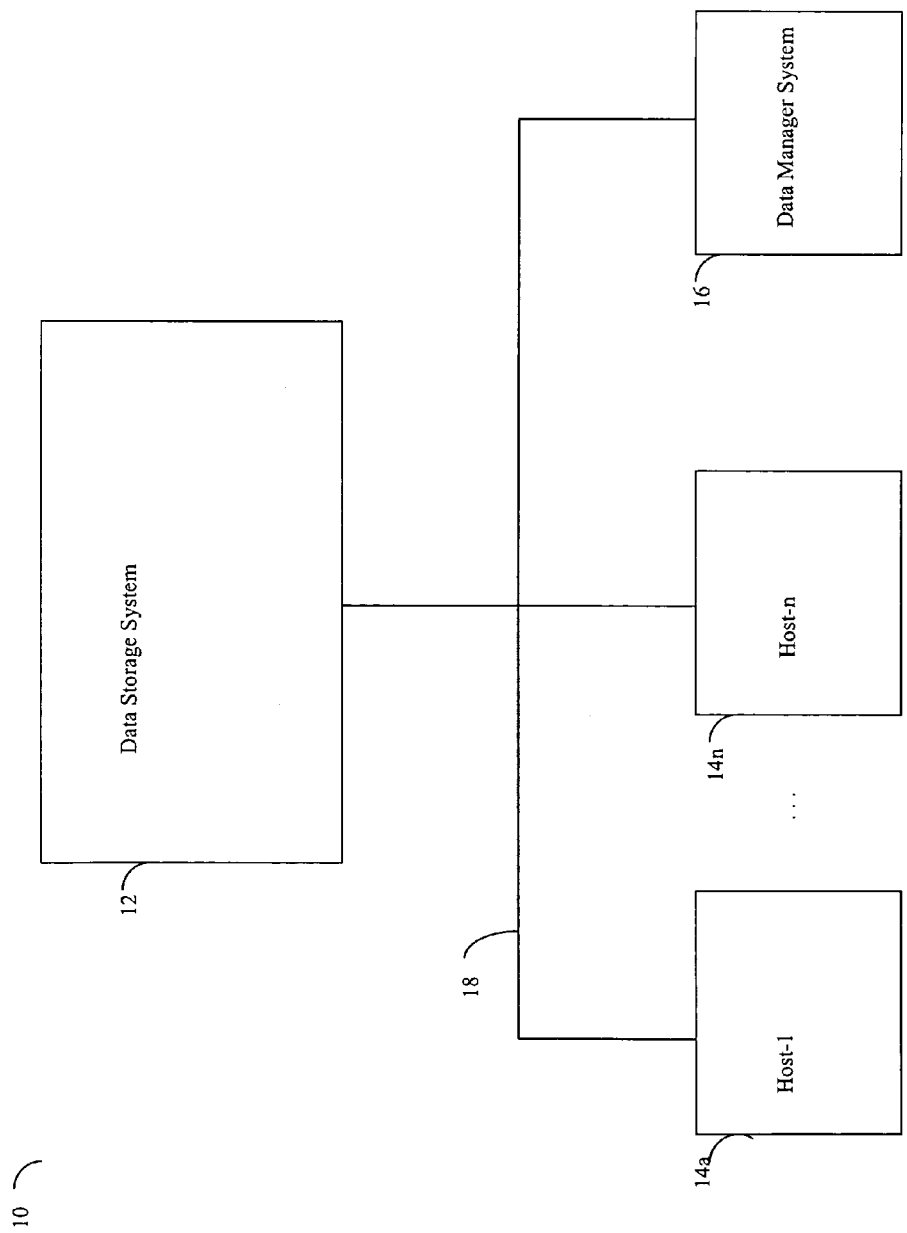
FIG. 1 is an example of an embodiment of a computer system according to the present invention.

Referring now to FIG. 1, shown is an example of an embodiment of a computer system according to the present invention. The computer system 10 includes a data storage system 12 connected to host systems 14a-14n, and a data manager system 16 through communication medium 18. In this embodiment of the computer system 10, the N hosts 14a-14n and the data manager system 16 may access the data storage system 12, for example, in performing input/output (I/O) operations or data requests. The communication medium 18 may be any one of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other connection(s) by which the host systems 14a-14n, and the data manager system may access and communicate with the data storage system 12, and may also communicate with others included in the computer system 10.

Each of the host systems 14a-14n, the data manager system 16, and the data storage system 12 included in the computer system 10 may be connected to the communication medium 18 by any one of a variety of connections as may be provided and supported in accordance with the type of communication medium 18. The processors included in the host computer systems 14a-14n and the data manager system 16 may be any one of a variety of commercially available single or multi-processor system, such as an Intel-based processor, IBM mainframe or other type of commercially available processor able to support incoming traffic in accordance with each particular embodiment and application.

It should be noted that the particulars of the hardware and software included in each of the host systems 14a-14n and the data manager system 16, as well as those components that may be included in the data storage system 12 are described herein in more detail, and may vary with each particular embodiment. Each of the host computers 14a-14n, as well as the data manager system 16, may all be located at the same physical site, or, alternatively, may also be located in different physical locations. Examples of the communication medium that may be used to provide the different types of connections between the host computer systems, the data manager system, and the data storage system of the computer system 10 may use a variety of different communication protocols such as SCSI, ESCON, Fibre Channel, or GIGE (Gigabit Ethernet), and the like. Some or all of the connections by which the hosts, data manager system 16 and data storage system 12 may be connected to the communication medium 18 may pass through other communication devices, such as a Connectrix or other switching equipment that may exist such as a phone line, a repeater, a multiplexer or even a satellite.

Each of the host computer systems as well as the data manager system may perform different types of data operations in accordance with different types of administrative tasks. In the embodiment of FIG. 1, any one of the host computers 14a-14n may issue a data request to the data storage system 12 to perform a data operation.

Figure 2:
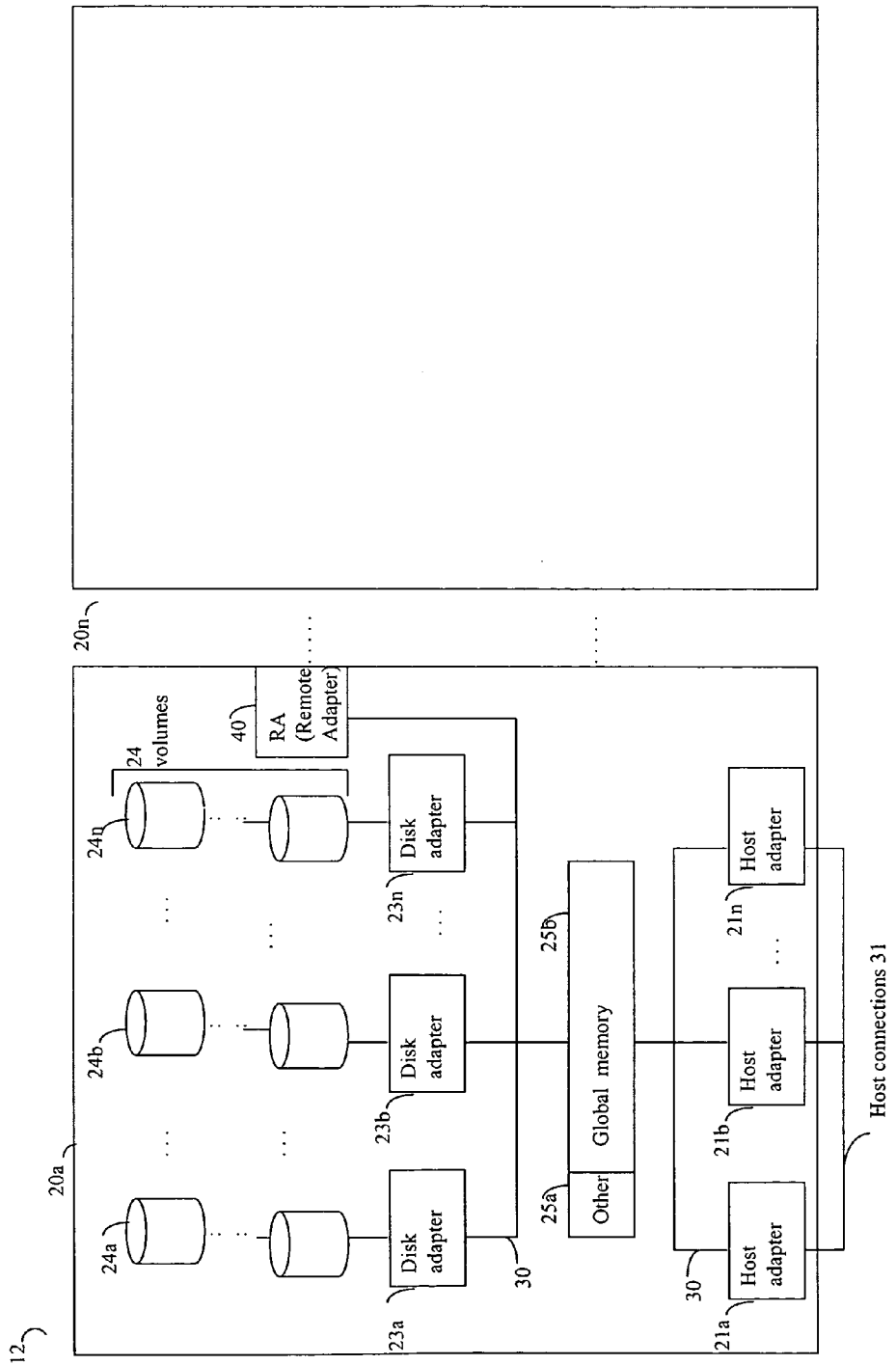
FIG. 2 is an example of an embodiment of a data storage system.

Referring now to FIG. 2, shown is an example of an embodiment of the data storage system 12 that may be included in the computer system 10 of FIG. 1. Included in the data storage system 12 of FIG. 2 are Symmetrix™ storage systems 20a-20n as manufactured by EMC Corporation of Hopkinton, Mass. In this particular example, each of the Symmetrix™ storage systems 20a-20n may be inter-connected (not shown) as well as to the host and data manager systems through any one or more communication connections 30 that may vary with each particular embodiment and device in accordance with the different protocols used in a particular embodiment. Additionally, the type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include other types of data storage systems in combination with one or more Symmetrix™ systems. Each of 20a-20n may be resources included in an embodiment of the computer system 10 to provide storage services to, for example, host computer systems and/or the data manager system.

Each of the Symmetrix™ systems, such as 20a, may include a plurality of disk devices or volumes, such as the arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the Symmetrix™ system 20a, a single DA, such as 23a, may be responsible for the management of a row of disks or volumes, such as row 24a. Each of the DAs 23a-23n may be connected, for example, by a bus or other communication connection to a cache that includes a particular portion designated as global memory 25b. The DAs 23a-23n may perform data operations to and from the cache that may be included in the global memory 25b, for example, in communications with other disk processors or directors, and other components of the system 20a. Generally, the global memory 25b may be used in facilitating communications between components in the system 20a. The other portion 25a is that portion of memory that may be used in connection with other designations that may vary in accordance with each embodiment. In one embodiment, portions of configuration and device information may be stored in global memory 25b.

The system 20a may also include one or more host adapters ("HAs") or directors 21a-21n. Each of these HAs may be used to manage communications and data operations between one or more host systems and the global memory.

It should be noted that the directors or processors within a data storage system as illustrated in FIG. 2 may communicate with global memory using communication connections other than through a bus, switch, and the like. An embodiment, for example, may provide dedicated communication paths with point-to-point connections between directors and global memory to provide for obtaining data without incurring the overhead of bus arbitration and switch contention. Additionally, an embodiment may use a data storage system having a global memory configured with independent global memory regions, each with separate access logic.

The particular data storage system as described in this embodiment, such as a Symmetrix™ system by EMC Corporation or a disk, should not be construed as a limitation. Other types of commercially available data storage systems, as well as processors and hardware controlling access to these particular devices, may be also be included in an embodiment.

Also shown in the storage system 20a is an RA or remote adapter 40. The RA may be hardware including a processor used to facilitate communication between data storage systems, such as between two Symmetrix data storage systems. The RA may be used with the Remote Data Facility (RDF) product provided by EMC Corporation of Hopkinton, Mass.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. The HAs may be used in connection with communications between a Symmetrix data storage system and a host system. The RAs may be used in facilitating communications between two Symmetrix data storage systems. The DAs may be used in connection with facilitating communications to the associated disk drive(s) and LV(s) residing thereon.

The DA may cause I/O operations to be performed on a volume or device. In the following description, data may be accessed by LV in which a single DA manages data requests in connection with I/O operations of multiple LVs that may reside on a disk. The DA may accomplish this by creating job records for the different LVs associated with the particular DA. These different job records may be associated with the different LVs in a data structure stored and managed by each DA.

Figure 3:
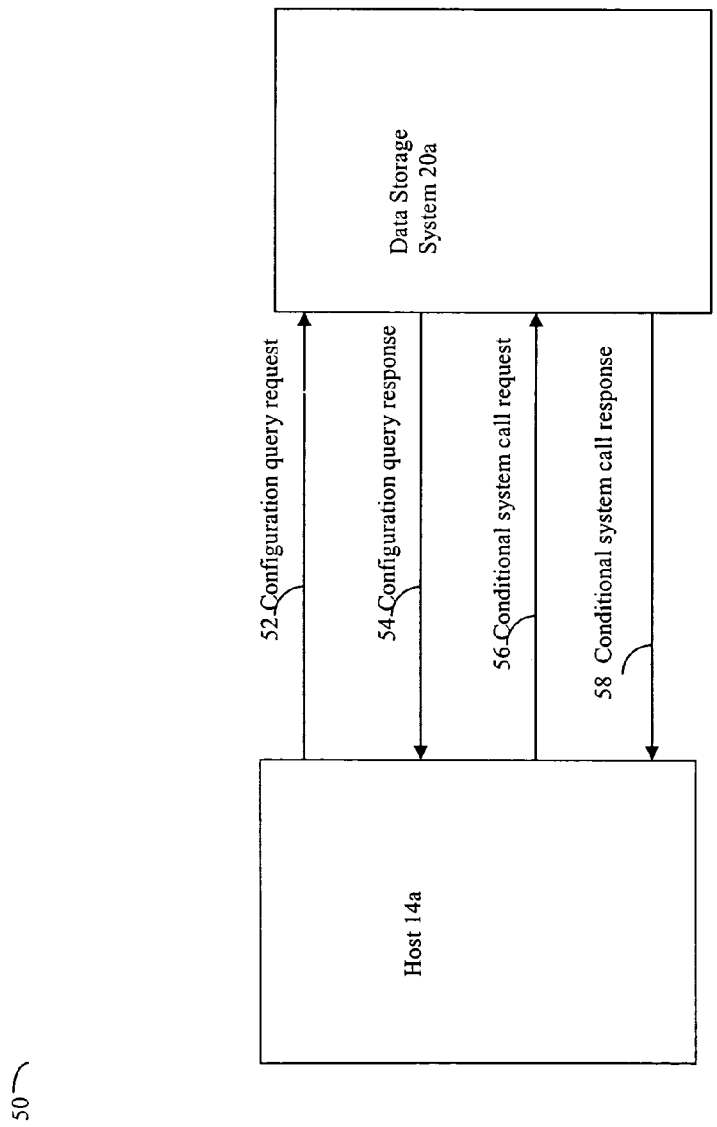
FIG. 3 is an example of an embodiment of requests and responses that may be exchanged between a host and a data storage system in the computer system of FIG. 1.

Referring now to FIG. 3, shown is an example of an embodiment 50 of requests and responses that may take place between a host system, such as host system 14a, and a data storage system, such as data storage system 20a. It should be noted that the example 50 represents a simplified illustration of requests and responses that may be exchanged between a host system and a data storage system included in the computer system 10 of FIG. 1. The particular host as well as the data storage system described in FIG. 3 are shown for the sake of simplicity of illustration of the techniques described in following paragraphs.

Methods that may be executed in an embodiment of a computer system using these particular system requests and responses as illustrated in the example 50 are described elsewhere herein.

The host 14a may issue a query in the form of a system call, as represented by the configuration query request 52, to obtain configuration information from the data storage system 20a. This configuration information may include information regarding the state of the data storage system 20a. In response, the data storage system 20a may return a configuration query response 54 to the host 14a. In this particular embodiment, the configuration query response 54 may return status information regarding one or more configuration parameters describing the state of the data storage system 20a. A single configuration query request 52 and configuration query response 54 may be used as an alternative, for example, to the host performing multiple calls to, and receiving multiple responses from, the data storage system to obtain configuration information. The configuration query response 54 may be characterized as a consolidated response including information about multiple configuration parameters for the data storage system 20a. The information returned in the response 54 may be the actual raw configuration parameter values, or one or more other values based on the actual raw configuration parameter values. For example, the raw configuration information about a device may include the number of free blocks on that device at a particular time a request is made. The information returned in the response 54 may include the raw configuration data (i.e., the number of free blocks), or one or more values indicating the last I/O operation performed to the device and a time value associated with this I/O operation, or some combination thereof. Other embodiments may return other values representing the one or more configuration values.

It should be noted that the raw configuration information may characterize a data storage system, one or more particular devices within a data storage system, multiple data storage systems, and the like, and may vary in accordance with each embodiment.

The host 14a may use a portion of the information included in the response 54 alone, or in conjunction with other information described in following paragraphs, to perform a conditional system call request 56. The conditional system call request 56 is a request by the host 14a to the data storage system 20a to perform a system call dependant on the state of configuration information as specified in the conditional system call request 56. The data storage system 20a will perform the particular system call request 56 if the specified configuration criteria as included in the conditional system call request 56 is met. In response, the data storage system 20a may send a conditional system call response 58a to the host 14a indicating a status of the conditional system call request 56.

Each of the elements 52, 54, 56 and 58 are described in more detail in following paragraphs.

Figure 4:
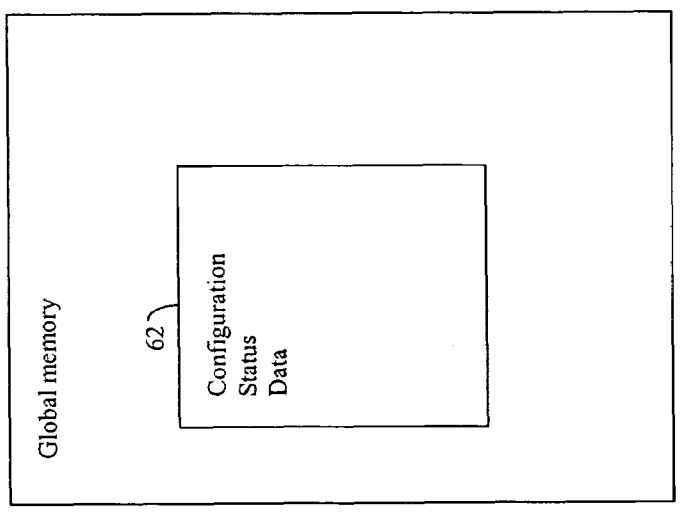
FIG. 4 is an example of one set of data that may be included in global memory.

Referring now to FIG. 4, shown is an example of one set of data that may be included in global memory. The example 60 illustrates that configuration status data 62, as may be included or used in forming the configuration query response 54, may be stored in the global memory of a data storage system, such as the data storage system 20a. The configuration status data 62 included in the global memory may be updated and/or otherwise modified in accordance with other operations ongoing within the computer system 10 and the associated data storage system(s). The configuration status data 62 is shown in 60 as being included in global memory. However, depending on the particular configuration parameters and associated information provided, the configuration status data may be stored elsewhere within the data storage system.

The configuration status data 62 may include portions of the raw configuration data, or data which may be derived from, or based on, one or more pieces of different types of configuration data stored within the global memory, or elsewhere within a data storage system. It should be noted that an embodiment may also include a combination of the raw configuration data as well as one or more values which are derived from, or based on, the raw configuration data. The configuration status data 62 may be characterized as consolidated configuration information that may otherwise be obtained from one or more other data sources. Rather than consult the one or more other data sources to formulate a configuration query response 54, the configuration status data 62 may be used. The configuration status data 62 may be maintained as part of the processing performed in connection with other operations. For example, an additional processing step may be performed in connection with an I/O operation for a device to update appropriate information in the configuration status data 62.

Figure 5:
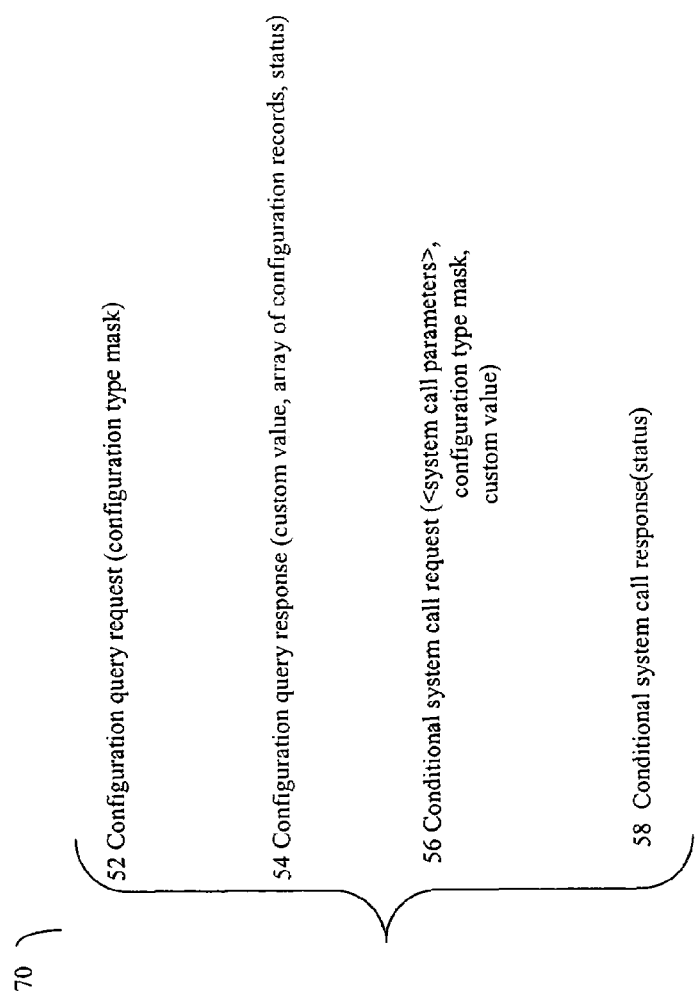
FIG. 5 is an example of a representation of the requests and responses exchanged in FIG. 3.

Referring now to FIG. 5, shown is an example 70 of a representation of each of the different requests and responses that may exchanged between the host 14*a* and the data storage system 20*a*. In one embodiment, the configuration query request 52 may include a single parameter, the configuration type mask. The configuration type mask parameter may be implemented as a bit mask. The host system 14*a* may specify, via the bit mask, one or more particular bit values that will be used in connection with the configuration query response 54. The configuration type mask parameter may include a bit position associated with each particular configuration parameter that may be returned in the configuration query response. An embodiment may also include a configuration type mask parameter that corresponds to only a portion of the possible configuration parameters that may be returned by the configuration query response as well.

The configuration query response 54 in this embodiment includes a first parameter that is a custom value, a second parameter that is an array of configuration records, and a status value. The array of configuration records may include a record for each of the different possible parameters of the data storage system 20*a*. In other words, the configuration query response 54 in this example returns a single configuration record for each possible system parameter value. However, an embodiment may return information on fewer than all the configuration parameters. An embodiment of the configuration record is described in more detail in following paragraphs and may include a current configuration value for each of the different possible configuration parameters. The current configuration value associated with each particular configuration parameter may be characterized as representing the state of that particular configuration parameter at a particular point in time. The configuration state may be based on the raw configuration value or values as well as additional information, such as a time factor. In one embodiment, the current configuration value association with a configuration parameter may be the output of a hash function dependent on one or more state parameters as well as a particular hashing function that may be used in an embodiment. The custom value, the first parameter in the configuration query response 54, may specify a resulting signature value in accordance with the configuration type mask and the current configuration values for each of the parameters specified in the configuration type mask. The current configuration values may be obtained from the configuration status data 62 described elsewhere herein. The status value, the third parameter of the configuration query response, may represent a status regarding the response 54.

As just described, the custom value of the configuration query response 54 may be formed in an embodiment in accordance with the configuration type mask and the particular values for each of the different configuration parameters at a point in time. The custom value may be characterized as a single value representing one or more pieces of configuration state information at a particular point in time. The custom value and the configuration type mask may be included as two additional parameters for every system call request in an embodiment. In other words, an embodiment may include a modified version of each system call in which the modified version includes the two additional parameters: the configuration type mask and the custom value. A conditional system call request 56 may include these two parameters in addition to any parameters that are included with performing a system call. The configuration type mask and the custom value may be used in conditionally performing the system call in accordance with the state of the current data storage system. The system call request is performed if the current value of the one or more configuration parameters match those specified in accordance with the configuration type mask and the custom value. The configuration query response 54 may be used to obtain a snapshot of the state of the data storage system and a custom value produced in accordance with one or more of those configuration parameters at a point in time. Subsequently, a system call may conditionally be performed, using the conditional system call request 56, if the state of the data storage system as indicated by the custom value has not changed.

It should be noted that an embodiment may include a special form of a conditional system call request for any one or more system call requests already included in an embodiment. In response to the conditional system call request 56, a data storage system may return a conditional system call response 58 to return status information to the host regarding the performance of the requested system call. The status of the conditional system call response 58 may include a value indicating success, failure or another condition of the requested system call.

The configuration query request 52 may cause the data storage system to query the configuration status data 62, as may be stored in global memory, and to retrieve information regarding the last time certain configurations were altered or particular operations performed. The configuration status data 62 may be in the form of a table or other data structure. The configuration status data 62 that may be stored in global memory may be erased or initialized, for example, each time a data storage system is reinitialized, brought on line, and the like.

Figure 6:
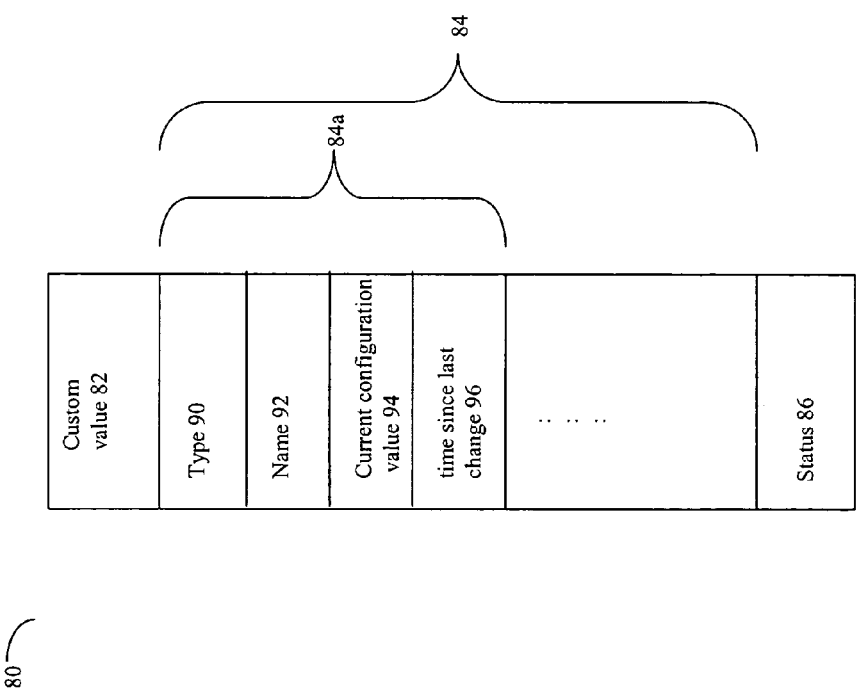
FIG. 6 is an example of an embodiment of a data structure including return parameters of configuration information as received by a host from a data storage system.

Referring now to FIG. 6, shown is an example of an embodiment 80 of a data structure representing the return parameters that may be specified in a configuration query response 54 as returned to a host system, such as 14*a*. The host 14*a* may allocate the storage associated with the data structure 80. The data structure 80 includes storage for each of the return parameters with respect to the host system included in the configuration query response 54 described in connection with the representation 70 of FIG. 5. The data structure 80 includes a custom value field 82, an array of configuration records 84, and a status field 86. In one embodiment, the custom value field 82 may include 16 bytes of information reflecting the state of one or more configuration parameter values as specified in accordance with the configuration type mask, an input parameter in the configuration query request 52. In one embodiment, the custom value 82 may be the result of performing a logical XOR (exclusive OR) operation on each of the current configuration values 94 for one or more system parameters as specified in the configuration type mask input parameter. This custom value may be formed by the data storage system using the configuration status data 62. Each of the records of information 84a for each of the configuration parameters may include 4 fields. Each configuration parameter record 84a may include type information 90, name information 92, a current configuration value 94, and an absolute time since this configuration parameter was last changed 96. In one embodiment, the type field 90 may be a single byte of information representing the particular type of configuration parameter being described by the associated record 84a. The different types of configuration parameters may include, for example, information regarding: locks of a particular data storage system, locks of a particular device on a data storage system, a database operation, operations between data storage systems and devices therein, such as RDF operations, dynamic RDF operations, and BCV operations, operations on groups of one or more associated devices, changes in physical drives, updates to raw configuration data, and the like.

It should be noted that RDF or the Remote Data Facility is a product provided by EMC Corporation of Hopkinton, Mass. RDF may be used in an embodiment to copy data from one storage system to another. For example, if a host writes data to a first storage device in a first data storage system, it may be desirable to copy that data to second storage device in a different data storage system in a different location, for example, so that if a disaster occurs that renders the first storage device inoperable, the host (or another host) may resume operations using the second storage device. With RDF, a first storage device, denoted the "primary storage device" (or "R1") is coupled to the host. One or more other storage devices, called "secondary storage devices" (or "R2") receive copies of the data that is written to the primary storage device by the host. The host interacts directly with the primary storage device, but any data changes made to the primary storage device are automatically provided to the one or more secondary storage devices using RDF. The primary and secondary storage devices may be connected by a data link, such as an ESCON link, a Fibre Channel link, and/or a Gigabit Ethernet link. The RDF functionality may be facilitated with an RDF adapter (RA) provided at each of the storage devices. In an embodiment, these R1 and R2 pairings may be defined and modified in a static manner, and/or in a dynamic manner, such as during operation of the data storage system. BCVs are a type of device that may also be included in an embodiment. A BCV device may be used to mirror a standard logical device. The BCV can also be split from its standard logical device after being mirrored and can be resynced (i.e., reestablished as a mirror) to the standard logical devices after being split. In addition, a BCV can be remotely mirrored using RDF, in which case the BCV may propagate data changes made thereto (while the BCV is acting as a mirror) to the BCV remote mirror when the BCV is split from the corresponding standard logical device. Operations such as the foregoing may be performed on BCV type of devices in an embodiment. Other embodiments may include other device types and use other facilities for which different types of configuration parameters may be used. The foregoing are examples for purposes of illustration of the techniques described herein.

In one embodiment, the configuration type information 90 may be stored as a single byte. However, other embodiments may use other lengths in accordance with the number of types included in an embodiment. It should be noted that the particular configuration parameters and information stored in the configuration status data 62 may vary in accordance with each embodiment, for example, in accordance with the different types of devices, operations, and the like, in an embodiment.

The name field 92 may be a string or other type of descriptor that includes an identifier for the corresponding type 90. In one embodiment, the name field 92 may be represented as 7 bytes. However, an embodiment may use a different length and data type to represent a name or other identifier in accordance with a particular representation of each embodiment. The current configuration value 94, as described elsewhere herein in more detail, may be characterized as a single value corresponding to the current configuration value for the configuration parameter described by a record 84a at a particular point in time associated with a response. In one embodiment, the current configuration value 94 may be represented in 4 bytes. However, other embodiments may use a different length for the current configuration value 94 in accordance with the particular values in each embodiment. The time since last time change field 96 indicates an absolute time since a last change was made with respect to the particular configuration parameter described by the record 84a. In one embodiment, the value associated with a field 96 may be represented in seconds within a four (4) byte field. Other embodiments may use different time units as well as a different length than as described herein. In one embodiment, the time since last change 96 indicates the amount of time in seconds that the associated configuration parameter has been at the current configuration value 94.

It should be noted that an embodiment of the configuration query response 54 may also include an additional return parameter that contains the serial number or other identifier of the particular data storage system sending the response. An embodiment may store the configuration status data used in connection with the configuration query response 54 within a single table in global memory, as described in connection with FIG. 4. The data storage system may maintain the separate table within global memory containing all of the information needed in formulating the configuration query response. This may be used in an embodiment to produce the configuration query response 54 without obtaining data from one or more other sources.

The configuration query request 52 and configuration query response 54 may be used in an embodiment to return configuration information about one or more of the configuration parameters associated with a particular data storage system. The foregoing may be performed in an embodiment as an alternative, for example, to performing multiple system calls to request and obtain the different configuration parameters which are returned as a single configuration query response. The request and responses described herein in the representation 70 of FIG. 5 may be used in connection with executing a system call, such as on the data storage system, in accordance with a particular configuration state. The configuration state may be represented using the custom value describing one or more configuration parameters or resources. The system call will be performed using the conditional system call request 56 if there has been no state change with respect to the one or more configuration conditions represented by the custom value. For example, the foregoing requests 52, 56 and responses 54, 58 may be used in connection with issuing a command as long as there have been no changes to a data storage lock, to a particular group of named devices, to the amount of storage space available on a device or data storage system, and the like.

Figure 7:
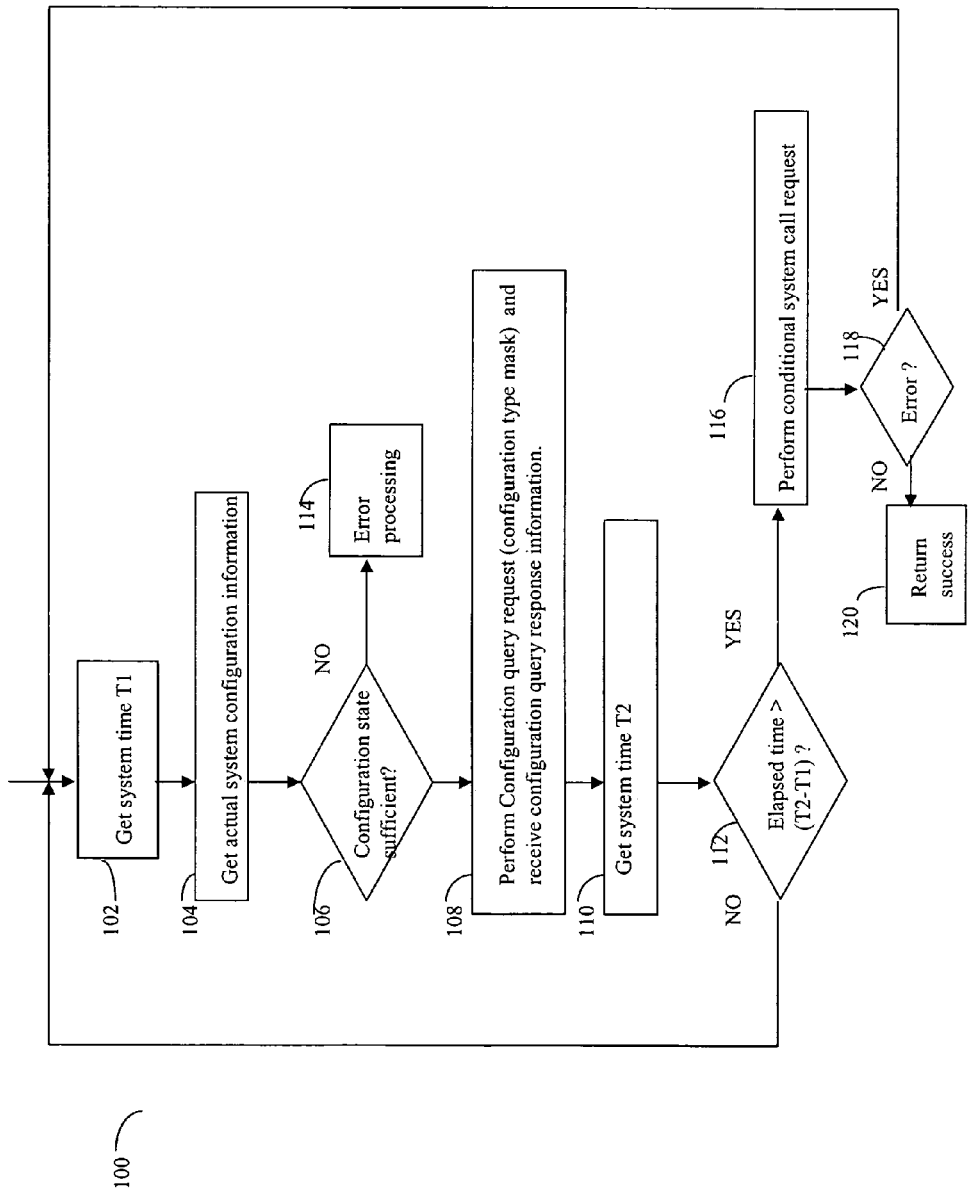
FIGS. 7-9 are flowcharts of steps that may be performed in an embodiment using the requests and responses illustrated in FIGS. 3 and 5.

Referring now to FIG. 7, shown is a flowchart 100 of a method that may be performed in one embodiment using the requests 52, 56 and responses 54, 58 described herein. The steps of flowchart 100 are described with respect to steps that may performed by a host system, such as the host system 14a described in connection with FIG. 3. At step 102, system time T1 may be obtained. The system time may be, for example, system time maintained by the host system and returned via a system call included in an embodiment. At step 104, system configuration information is obtained. The system configuration information obtained at step 104 may be the actual or raw system configuration information. It should be noted that the system configuration information obtained at step 104 may differ from the information returned in a configuration query response 54. In particular, the configuration query response may return values that are not the actual or raw configuration information. The system configuration information returned at step 104 may be the raw configuration information. The configuration query response 54 may return state information based upon one or more pieces of raw configuration information, for example, such as whether a particular configuration parameter value has been modified rather than include the particular value itself. Alternatively, the information returned by the configuration query response may also include the raw value. For purposes of example with the flowchart 100, the system configuration information obtained at step 104 may represent the actual or raw configuration data and the information returned in the configuration query response 54 may include a state value corresponding to the particular configuration information obtained at step 104. The system configuration information obtained at step 104, for example, may include information regarding the amount of free storage or space available on a particular device.

At step 106, a determination is made as to whether the current configuration state is sufficient. The current configuration state may be indicated by the actual system configuration information. An embodiment may determine whether a current configuration state is sufficient by comparing the current configuration state, as may be indicated by the actual system configuration information, or a portion thereof, and a desired system state. The particular items of interest in the actual system configuration information may be examined. For example, a host may desire to issue a request to a data storage system via a call if a particular amount of storage space is available on a particular data storage system. The amount of storage needed may be compared to the amount as indicated by the actual system configuration information obtained at step 104 to determine if the current configuration state is sufficient. If the current configuration state is not sufficient, such as the amount of storage indicated is not sufficient, control proceeds to step 114 where error processing may be performed. Error processing may include, for example, returning an error to the requesting application, retrying the requested operation at a later time, and the like. At step 106, if a determination is made that the configuration state as indicated by the actual configuration information is sufficient, control proceeds to step 108 where a configuration query request is performed and the configuration query response information is subsequently received. It should be noted that the configuration query request and response noted at step 108 are, respectively, the request and response 52 and 54 described elsewhere herein, such as in connection with FIG. 5. At step 110, the system time at a second point in time, T2, is obtained. At step 112, a determination is made as to whether the value of T2 minus T1 is less than the elapsed time as indicated in the return information of the configuration query response. The elapsed time in one embodiment may be obtained using the time since last changed field 96 as included in each record of returned information for each configuration parameter. If the elapsed time is greater than T2 minus T1, it indicates that a change has been made to the configuration since the system configuration information was obtained at step 104. Accordingly, control proceeds to step 102. Otherwise, if the elapsed time is greater than the difference of T2 minus T1, control proceeds to step 116 to perform the conditional system call request. The conditional system call request at step 116 may pass as input parameters system call parameters, and the configuration type mask and custom value described elsewhere herein. The custom value may represent the state of one or more configuration parameters as indicated in the configuration type mask.

The conditional system call request executed at step 116 performs processing steps to determine if the current state of the data storage system matches an expected state as specified in accordance with the custom value. If an error has occurred in performing the system call request as determined at step 118, control proceeds to step 102. Alternatively, it should be noted that an embodiment may choose to perform error processing upon the occurrence of an error which includes stopping processing and returning an error code in accordance with the results returned from performing the conditional system call request at step 116. An error may occur, for example, if the current configuration state of the data storage system is not as expected as indicated by the custom value. At step 118, if no error has occurred in performing the conditional system call request, control proceeds to step 120 to return a success value or code, for example, to a requesting host.

It should be noted that an embodiment may perform the processing steps of flowchart 100 of FIG. 7 using the time since last changed field as the elapsed time, and also using a custom value as an input parameter to the conditional system call request. In one embodiment, the custom value may be produced by the data storage system using one or more current configuration values 94 that may be obtained using the configuration status data 62. If the current configuration values are not sufficiently unique to represent the possible different states of the associated configuration parameters at different points in time to a sufficient degree, the time value as indicated by the elapsed time may also be used to identify a configuration state. For example, a particular configuration parameter may be one of four values corresponding to four particular raw configuration values. It is possible for the state of this particular configuration parameter to be set from the first value to the second value and then back to the first value again at different points in time. If only the configuration value is used to distinguish the state of a particular configuration parameter, an embodiment may not be able to discern a state change based on the absolute configuration parameter value. An embodiment may therefore use the configuration parameter value in combination with the absolute time as returned in the configuration query response to determine if there has been a change with regard to the state of this particular configuration parameter value. Alternatively, if the custom value produced using the one or more configuration values sufficiently represents a configuration state change at different points in time, then the use of the elapsed time may be omitted.

Figure 8:
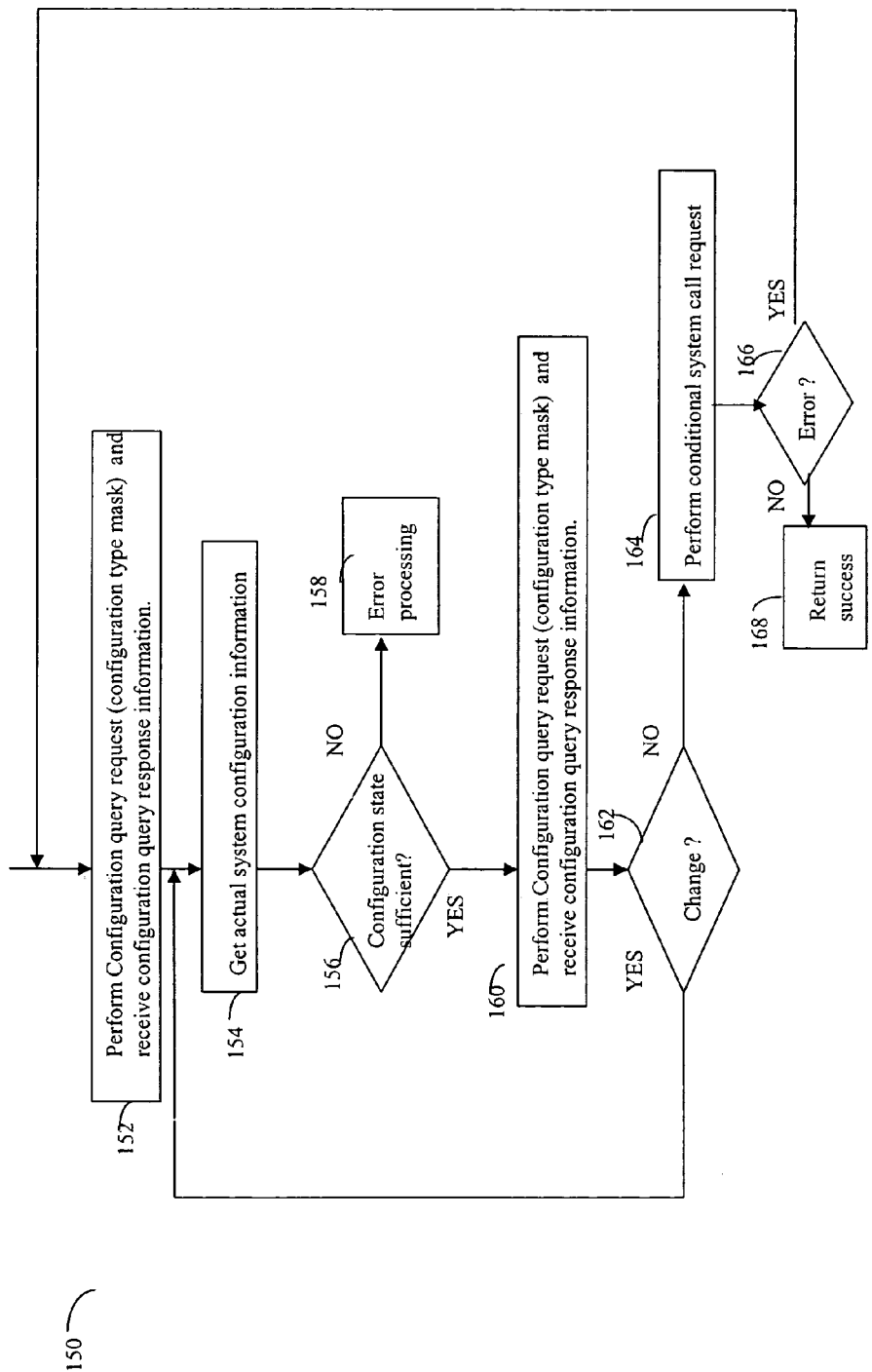

Referring now to FIG. 8, shown is a flowchart 150 of steps of another embodiment that may be used in connection with performing a system call request. At step 152, the configuration query request is performed. At step 154, actual or raw system configuration information may be obtained. The actual or raw system configuration information obtained at step 154 is similar to that as described in connection with step 104 of flowchart 100 of FIG. 7. At step 156, a determination is made as to whether the actual current system configuration information indicates that the system configuration is sufficient for the particular request. If not, control proceeds to step 158 to perform error processing. Otherwise, control proceeds to step 160 to perform a configuration query request and to receive a configuration query response information from the data storage system. Control proceeds to step 162 where a determination is made as to whether there has been a change in configuration state with respect to the custom values obtained at step 160 and step 152. If there has been a change, control proceeds to step 154. Otherwise, if the custom values compared do not indicate that there has been a change, control proceeds to step 164 to perform the conditional system call request. If there has been an error in executing the system call request as determined at step 166, control proceeds to step 152. Otherwise, if no error has been detected in connection with performing the conditional system call request at step 164, control proceeds to step 168 to return a success value.

It should be noted that the flowchart 150 performs two calls of the configuration query request and receives two configuration query responses at steps 152 and 160. Step 162 compares the custom values to make a determination as to whether there has been a change with respect to configuration state information of the data storage system for the particular parameters of interest. The processing steps of flowchart 150 may be performed without using an elapsed time in an embodiment in which the custom values, as may be formed from the one or more current configuration values of field 94, are sufficiently unique to indicate a configuration state change of a data storage system. In other words, the processing steps of flowchart 150 may be executed in an embodiment where each of the custom values is sufficiently unique to represent and distinguish between the different states of a data storage system. A time value, for example, as may be used in the flowchart processing steps 100 of FIG. 7, may be also be used with the custom value to guarantee a sufficient level of uniqueness in representing different configuration states of a data storage system.

Figure 9:
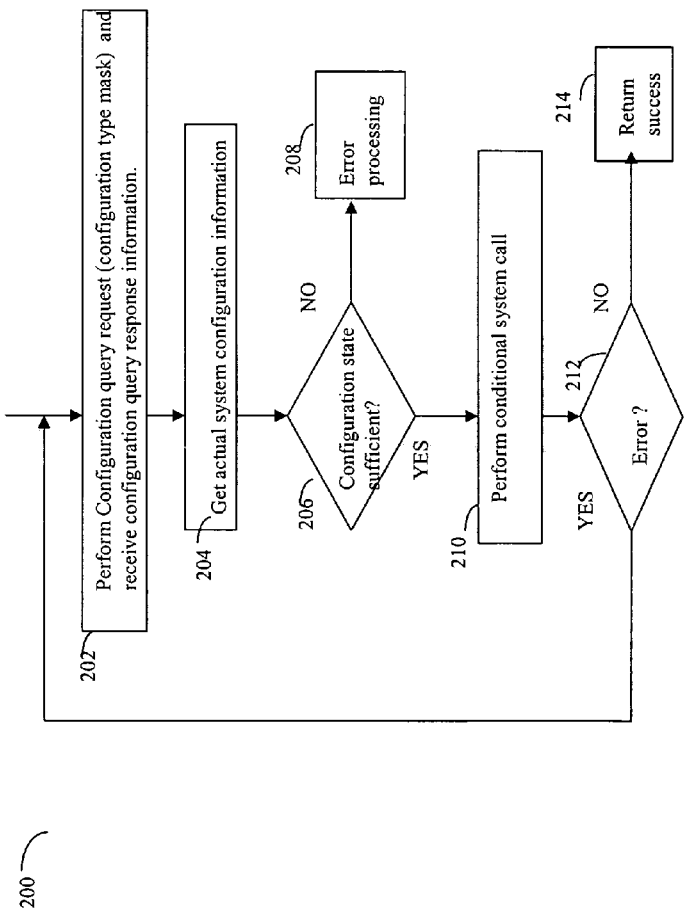

Referring now to FIG. 9, shown is a flowchart 200 of steps of another embodiment that may be performed in connection with issuing a system call request to a data storage system using the requests 52, 56, and responses 54, 58. The processing steps of flowchart 200 may be performed in an embodiment without using a time value, such as an elapsed time, in which the custom value may be used to sufficiently represent a configuration state change of a data storage system. At step 202, a configuration query request may be performed, as represented by 52, and a configuration query response may be received, as represented by 54. At step 204, the raw or actual system configuration information may be obtained. At step 206, a determination is made as to whether the actual system configuration information indicates that the configuration state is sufficient for the desired operation. If not, control proceeds to step 208 where error processing may be performed. Otherwise, control proceeds to step 210 where the conditional system call request, as represented by 56, may be performed. At step 212, a determination is made as to whether an error has occurred in connection with performing the conditional system call request of step 210 using information as may be returned by a response 58. If no error has occurred, control proceeds to step 214 to return a success value. Otherwise, control proceeds from step 212 to step 202.

As described herein in one embodiment, the custom value returned by the configuration query response may be the result of logically XORing each of the one or more different configuration values for the one or more parameters of interest. It should be noted that an embodiment may produce a custom value as a function of the one or more current configuration values for parameters of interest using other techniques. An embodiment may produce the custom value using a hash function, for example, which is dependent on one or more current parameter values. A hash function may also perform additional data operations such as, for example, using a mathematical modulus function to produce a resulting hash value within a specified range for a custom value field size and/or format included in an embodiment. Additionally, the resulting value may be produced using a function which minimizes the chance of a hash collision. As is well known, a hash collision occurs if a same resultant hash value is produced in accordance with two different sets of parameter values. It may be desirable to choose a particular hash function that minimizes the chance of a collision and additionally distributes as uniformly as possible any collisions that may occur. In the embodiment described herein, a custom value may represent a resulting hash function value that is 16 bytes in length. An embodiment may use other lengths to represent the particular custom values as hash function values.

As described herein, an embodiment may perform processing steps of flowcharts 150 or 200 when the custom values produced for different configuration states of the data storage system are sufficiently unique. In other words, an embodiment may use a custom value and a time value and/or other value to detect a configuration state change. The level of uniqueness may be characterized in accordance with the chance of a hash collision of a hash function used to produce the resultant custom value. A particular level of uniqueness may vary in accordance with each embodiment, for example, in accordance with size of a custom value used as well as the particular hash function.

As also described herein, the particular configuration values returned in the current configuration value field 94 for each configuration parameter may not contain raw parameter value or information that may be readily usable by a user. The particular configuration parameter values may be state dependent.

Figure 10:
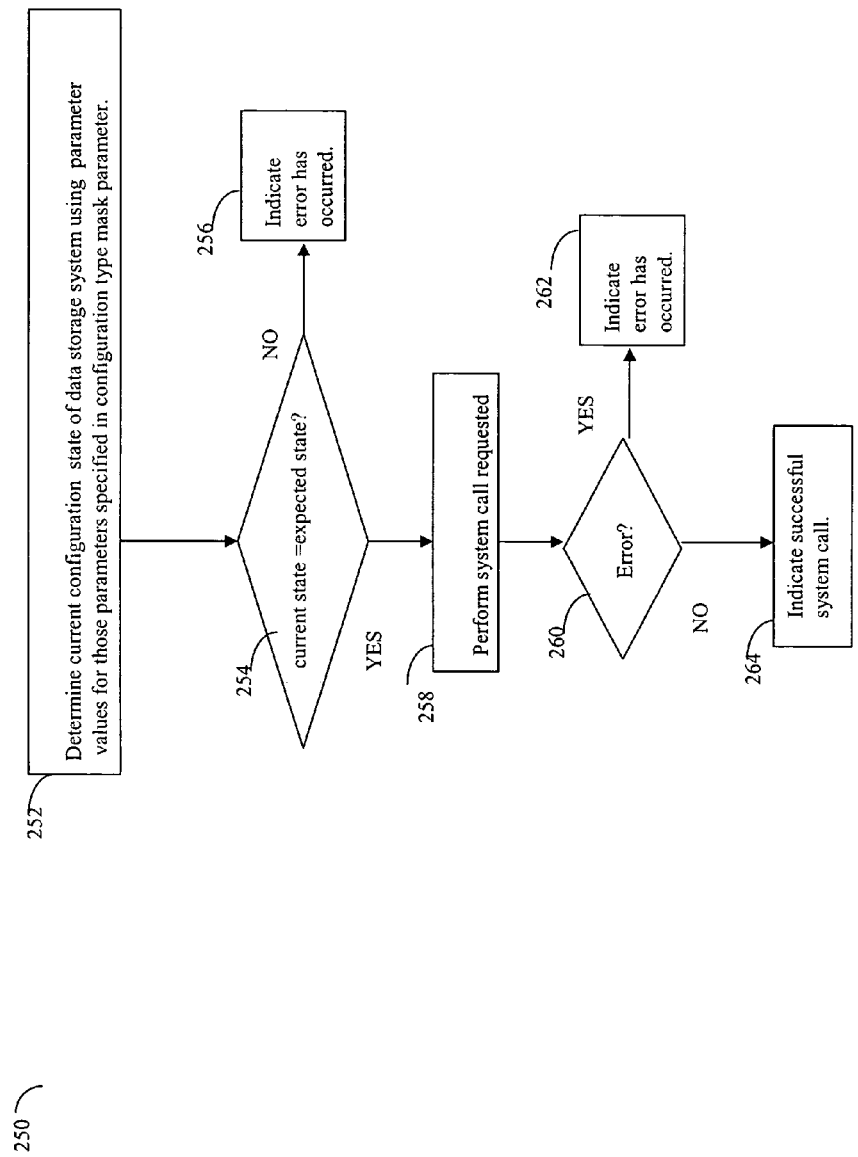
FIG. 10 is a flowchart of steps that may be performed in processing a conditional system call on a data storage system.

Referring now to FIG. 10, shown is a flowchart 250 of steps that may be performed in an embodiment by the data storage system when performing a conditional system call, such as may be represented by 56. At step 252, the current configuration state of the data storage system is determined using parameter values for those parameters specified in the configuration type mask parameter. In one embodiment, step 252 may cause the data storage system to retrieve configuration status data 62 from global memory. One or more values from the configuration status data 62 may be logically XORed as indicated by the configuration type mask input parameter to produce a current configuration state of the data storage system. Additionally, an embodiment may perform other processing in determining a custom value corresponding to a configuration state. For example, one embodiment may also perform a randomization of each parameter value returned in field 94 by rotating the value in accordance with a bit number or position corresponding to the bit position in the configuration type mask. At step 254, a comparison is made between the current configuration state, as determined at step 252, and the expected state, as specified in the custom value input parameter. If the current configuration state of the data storage system corresponds to the expected configuration state, control proceeds to step 258 to perform the system call requested. At step 260, a determination is made as to whether an error has occurred in performing the system call requested. If so, control proceeds to step 262 to indicate that an error has occurred such as, for example, by returning an error code to the host system. Otherwise, control proceeds to step 264 to indicate that the system call has completed successfully by returning, for example, a success status code to the host. If, at step 254, it has been determined that the current configuration state of the data storage system does not correspond to the expected configuration state, control proceeds to step 256 to indicate that an error has occurred. Step 256 may result in an error code being returned to the host system similar to that as performed at step 262.

It should be noted that in an embodiment may use multiple calls to obtain the actual or raw configuration data of a data storage system, for example, requested at step 104, step 154, and step 204. Additionally, at step 112, rather than compare a single elapsed time for a single configuration parameter value, an embodiment may perform a comparison for each configuration parameter value, or multiple values obtained at a point in time. If any one of the elapsed times does not meet the condition specified, for example, in step 112, control proceeds to step 102 rather than performing the conditional system call request at step 116.

An host included in an embodiment may use the configuration query request 52 and configuration query response 54 in monitoring the configuration of a data storage system. The host may use the custom value of configuration query response 54 returned at different points in time to detect when a change has occurred to the configuration. The host may be, for example, maintaining a local cache of one or more raw configuration values. The information returned in the response 54 may not be the actual raw configuration values, but rather may include an indicator as to when there has been a change to one or more the raw configuration values. Thus, the information returned in the response 54 may be used to monitor a configuration state change in one or more actual raw configuration values. If a configuration change has been detected, the host may then obtain the revised one or more actual raw configuration values.

Figure 11:
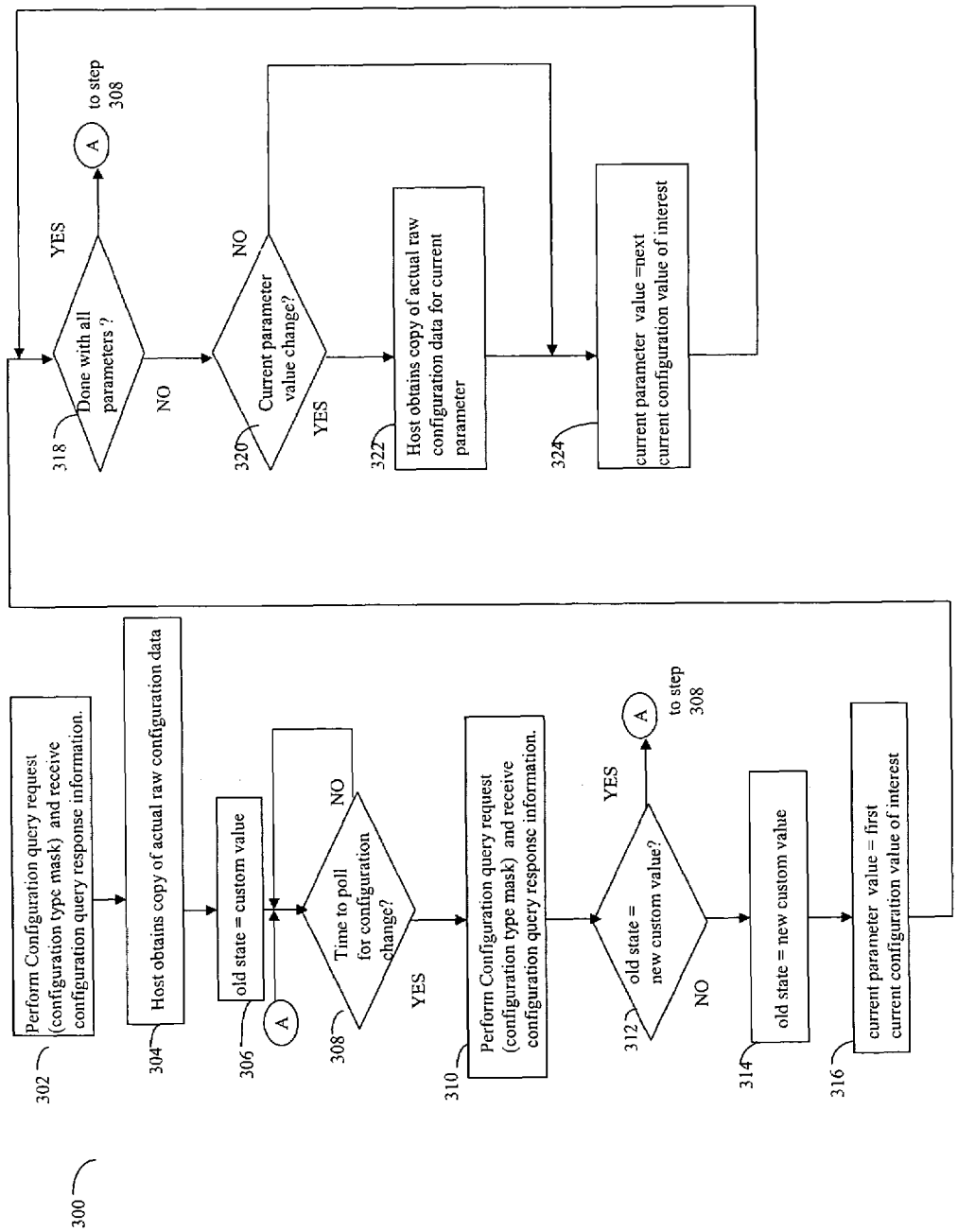
FIG. 11 is a flowchart of another method that may be performed in an embodiment using the configuration information obtained from the configuration query response of FIGS. 3 and 5.

Referring now to FIG. 11, shown is a flowchart 300 of processing steps that may be performed by a host in connection with monitoring a configuration state of a data storage system. The host may perform the processing steps of flowchart 300, for example, in connection with maintaining a host local cache of one or more actual raw configuration values. It should be noted that the processing steps of flowchart 300 may be used in an embodiment in which the custom value is used in determining if there has been a change in the configuration state of a data storage system. At step 302, the host performs a configuration query request and receives configuration status information returned in a configuration query response. The request and response of step 302 correspond, respectively, to the request 52 and response 54 described elsewhere herein in more detail. At step 304, the host obtains a copy of the actual raw configuration data of the one or more configuration values. The host may then store these values, for example, in a local cache. At step 306, the host stores the custom value returned at step 302 as the old state corresponding to the cached copy of the raw configuration data. Control proceeds to step 308 where a determination is made as to whether it is time to poll the data storage system for a snapshot of its current configuration. If not, control returns to step 308 until such time is reached. It should be noted that the polling interval used may vary in each embodiment. It should also be noted that an embodiment may poll the data storage system in connection with detecting a configuration change in response to one or more predetermined operations. Control proceeds to step 310 where the host performs a configuration query request and receives a configuration query response. At step 312, the host compares the previous custom value as stored in old state to the new custom value returned at step 312. If the values are determined to be the same at step 312, it indicates that there has been no configuration state change and control proceeds back to step 308 to wait for the next polling interval and/or operation. Otherwise, if the values differ, there has been a configuration state change and control proceeds to step 314 where the old state is updated with the new custom value obtained at step 310.

Processing steps may now be performed in determining which one or more particular configuration parameters of interest have changed, and obtaining these revised raw configuration values, for example, in order to update the host's local cache. At step 316, the current parameter value is assigned the first current configuration value of interest as may be obtained, for example, from the field 94 of the first element of the array of configuration records returned in the configuration query response information. At step 318, a determination is made as to whether all parameters of interest have been examined. If so, control proceeds to step 308. Otherwise, control proceeds to step 320 to determine if the current parameter value has changed. This may be determined by comparing the current parameter value, as obtained as part of step 310 processing from the latest configuration query response, with the previous value for the same parameter as returned from the previous configuration query response. If a determination is made as step 320 that the parameter value has changed, control proceeds to step 322 to obtain a revised actual raw configuration value for the current parameter. Control proceeds to step 324 to examine the next parameter and processing continues with step 318. If it is determined at step 320 that the current parameter value has not changed, control proceeds directly to step 324.

The flowchart 300 of FIG. 11 illustrates one particular example of how the configuration query request 52 and configuration query response 54 may be used in an embodiment to monitor configuration state changes. The single request 52 may be used to obtain an indicator as to whether the configuration values of interest have changed. The configuration status data 62 may be used as a first level of monitoring a configuration state change. The single request 52 may be more efficient than performing multiple requests to obtain data from multiple sources. Only when a change has been detected are the additional requests performed to obtain any revised actual raw configuration values.

The foregoing techniques using the requests, 52 and 56, and responses, 54 and 58, may be used in an embodiment to synchronize use of a resource such as, for example, hosts performing I/O operations that may interfere with one another. A first host may be preparing to perform a first operation to a device if there is a first number of free blocks. A second host may be preparing to perform a second operation to the same device if there is a second number of free blocks. It is not possible for there to be a total number of free blocks for both the first and second hosts to perform their respective operations at the same time. Both hosts A and B obtain the raw actual configuration data and see that the device has sufficient space for each of their respective operations. Both hosts A and B perform a configuration query request 52 to obtain a custom value included in the configuration query response 54 in which the custom value returned represents a configuration state of the raw actual configuration data. Both hosts A and B attempt to perform their I/O operations using a conditional form of the system call described herein with the request 56. A first of the hosts detects a successful I/O operation. The other host detects a failed I/O operation and may generate an error message, attempt to retry the operation, or perform some other processing to handle the failed I/O operation. At some later time, the first host completes the operation and storage space on the device is again made available for use by the second host. The second host retries its previously failed I/O operation which now succeeds. In the foregoing example, the requests 52 and 56 and responses 54 and 58 may be used to synchronize operations between the two hosts with respect to the same resource. The foregoing is an example use illustrating how the techniques described herein may be used control access to a resource as an alternative to, for example, use of locks.

It should be noted that any one of a variety of different techniques may be used in synchronizing access to the configuration status data 62. The particular synchronization technique may vary in accordance with each embodiment and may include, for example, use of a locking mechanism, critical region, and the like. These and other techniques are well known.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for executing a call on a data storage system comprising:
    receiving a configuration query request for configuration state information of the data storage system at a first point in time, the configuration query request including a first parameter identifying one or more configuration parameters, said one or more configuration parameters having one or more corresponding values representing said configuration state information at said first point in time;
    sending a configuration query response including a return value representing said one or more corresponding values;
    receiving a request to perform said call, said request including said return value and said first parameter indicating at least one conditional criteria for performing said call;
    evaluating said at least one conditional criteria in accordance with a current configuration of said data storage system represented by one or more current values for said one or more configuration parameters to determine whether there has been a change to said one or more corresponding values represented by said return value, wherein, there has not been a configuration change in the data storage system with respect to said at least one conditional criteria since said first point in time if said evaluating determines that said one or more corresponding values have not changed; and
    executing said call when said evaluating determines there has not been the configuration change since said first point in time with respect to said at least one conditional criteria in accordance with said current configuration.

2. The method of claim 1, wherein said conditional criteria includes an indication of at least one of: availability of a resource, performing an I/O operation, modifying raw configuration data, modifying a device, performing a database operation, and performing an operation with respect to an associated group of one or more devices.

3. The method of claim 1, further comprising:
    sending a request from a host to a data storage system to perform said call.

4. The method of claim 1, wherein said at least one conditional criteria includes a plurality of configuration conditions.

5. The method of claim 1, further comprising:
    receiving a first response at a point in time prior to a second point in time, said first response including first configuration information formed using data stored in a first location;
    receiving a second response at the second point in time, said second response including second configuration information formed using data stored in said first location; and
    determining whether there has been a change in configuration state using said first and second configuration information, wherein said first and said second configuration information each indicate a configuration state of said data storage system at different points in time.

6. The method of claim 5, further comprising:
    obtaining revised actual configuration data from a second location different from said first location.

7. The method of claim 6, wherein a time value is used in determining if there has been a change in configuration state.

8. The method of claim 5, further comprising:
    issuing, by a host to a data storage system, said request to perform said call if there has been no change in the configuration state determined.

9. The method of claim 1, wherein said request includes said first parameter specifying a configuration type mask with bit positions set to indicate one or more different configuration parameters, and said return value as a second parameter specifying a signature value in accordance with the one or more different configuration parameters indicated in said configuration type mask and current values for each of the configuration parameters indicated in said configuration type mask.

10. The method of claim 9, wherein said request includes one or more additional parameters including parameters used in performing said call if said call is performed by said executing.

11. The method of claim 1, wherein said configuration query request for current configuration information includes as said first parameter a configuration type mask with bit positions set to indicate one or more different configuration parameters, and wherein said return value is a signature value determined in accordance with said configuration type mask and current values for configuration parameters having appropriate bit positions set in said configuration type mask.

12. The method of claim 11, wherein said configuration type mask and said return value are included as parameters in said request.

13. The method of claim 1, wherein said evaluating includes performing processing, said processing including:
    determining a current configuration state value representing said one or more current values; and
    comparing said current configuration state value and said return value to determine whether there has been the configuration change to said data storage system with respect to said at least one conditional criteria since said first point in time.

14. The method of claim 1, wherein said return value is produced by performing first processing, said first processing including:
    performing a logical exclusive OR operation using said one or more corresponding values.

15. A computer readable medium that includes code stored thereon that executes a call on a data storage system, the computer readable medium comprising executable code that:
  receives a configuration query request for configuration state information of the data storage system at a first point in time, the configuration query request including a first parameter identifying one or more configuration parameters, said one or more configuration parameters having one or more corresponding values representing said configuration state information at said first point in time;
  sends a configuration query response including a return value representing said one or more corresponding values;
  receives a request to perform said call, said request including said return value and said first parameter indicating at least one conditional criteria for performing said call;
  evaluates said at least one conditional criteria in accordance with a current configuration of said data storage system represented by one or more current values for said one or more configuration parameters to determine whether there has been a change to said one or more corresponding values represented by said return value, wherein, there has not been a configuration change in the data storage system with respect to said at least one conditional criteria since said first point in time if said evaluating determines that said one or more corresponding values have not changed; and
  executes said call when said evaluating determines there has not been the configuration change since said first point in time with respect to said at least one conditional criteria in accordance with said current configuration.

16. The computer readable medium of claim 15, wherein said conditional criteria includes an indication of at least one of: availability of a resource, performing an I/O operation, modifying raw configuration data, modifying a device, performing a database operation, and performing an operation with respect to an associated group of one or more devices.

17. The computer readable medium of claim 15, further comprising:
  executable code that sends a request from a host to a data storage system to perform said call.

18. The computer readable medium of claim 15, wherein said at least one conditional criteria includes a plurality of configuration conditions.

19. The computer readable medium of claim 15, further comprising executable code that:
  receives a first response at a point in time prior to a second point in time, said first response including first configuration information formed using data stored in a first location;
  receives a second response at the second point in time, said second response including second configuration information formed using data stored in said first location; and
  determines whether there has been a change in configuration state using said first and second configuration information, wherein said first and said second configuration information each indicate a configuration state of said data storage system at different points in time.

20. The computer readable medium of claim 19, further comprising:
  executable code that obtains revised actual configuration data from a second location different from said first location.

21. The computer readable medium of claim 20, wherein a time value is used in determining if there has been a change in configuration state.

22. The computer readable medium of claim 19, further comprising:
  executable code that issues, by a host to a data storage system, said request to perform said call if there has been no change in the configuration state determined.

23. The computer readable medium of claim 15, wherein said request includes said first parameter specifying a configuration type mask with bit positions set to indicate one or more different configuration parameters, and said return value as a second parameter specifying a signature value in accordance with the one or more different configuration parameters indicated in said configuration type mask and current values for each of the configuration parameters indicated in said configuration type mask.

24. The computer readable medium of claim 23, wherein said request includes one or more additional parameters including parameters used in performing said call if said call is performed by said executing.

25. The computer readable medium of claim 15, wherein said configuration query request for current configuration information includes as said first parameter a configuration type mask with bit positions set to indicate one or more different configuration parameters, and wherein said return value is a signature value determined in accordance with said configuration type mask and current values for configuration parameters having appropriate bit positions set in said configuration type mask.

26. The computer readable medium of claim 25, wherein said configuration type mask and said return value are included as parameters in said request.

27. A computer system comprising:
  a host issuing a request to perform a call; and
  a data storage system comprising executable code that executes said call, said data storage system including executable code that:
    receives a configuration query request for configuration state information of the data storage system at a first point in time, the configuration query request including a first parameter identifying one or more configuration parameters, said one or more configuration parameters having one or more corresponding values representing said configuration state information at said first point in time;
    sends a configuration query response including a return value representing said one or more corresponding values;
    receives said request to perform said call, said request including said return value and said first parameter indicating at least one conditional criteria for performing said call;
    evaluates said at least one conditional criteria in accordance with a current configuration of said data storage system represented by one or more current values for said one or more configuration parameters to determine whether there has been a change to said one or more corresponding values represented by said return value, wherein, there has not been a configuration change in the data storage system with respect to said at least one conditional criteria since said first point in time if said evaluating determines that said one or more corresponding values have not changed; and
    executes said call when said executable code that evaluates determines that there has not been the configuration change since said first point in time with respect to said at least one conditional criteria in accordance with said current configuration.

28. The computer system of claim 27, wherein said conditional criteria includes an indication of at least one of: availability of a resource, performing an I/O operation, modifying raw configuration data, modifying a device, performing a database operation, and performing an operation with respect to an associated group of one or more devices.

29. The computer system of claim 27, wherein said at least one conditional criteria includes a plurality of configuration conditions.

30. The computer system of claim 27, wherein said host further comprises executable code that:

receives a first response at a point in time prior to a second point in time, said first response including first configuration information formed using data stored in a first location;

receives a second response at the second point in time, said second response including second configuration information formed using data stored in said first location; and determines whether there has been a change in configuration state using said first and second configuration information, wherein said first and said second configuration information each indicate a configuration state of said data storage system at different points in time.

31. The computer system of claim 30, wherein said host further comprises:

executable code that obtains revised actual configuration data from a second location different from said first location.

32. The computer system of claim 31, wherein said host further comprises executable code that:

issues, to said data storage system, said request to perform said call if there has been no change in the configuration state determined.

* * * * *